(12) United States Patent
Nongpiur

(10) Patent No.: US 9,813,810 B1
(45) Date of Patent: Nov. 7, 2017

(54) MULTI-MICROPHONE NEURAL NETWORK FOR SOUND RECOGNITION

(71) Applicant: Google Inc., Mountain View, CA (US)

(72) Inventor: Rajeev Conrad Nongpiur, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/988,047

(22) Filed: Jan. 5, 2016

(51) Int. Cl.
H04R 3/12 (2006.01)
H04R 3/00 (2006.01)
H04R 1/40 (2006.01)
G10L 25/51 (2013.01)
G06N 3/08 (2006.01)

(52) U.S. Cl.
CPC .............. *H04R 3/005* (2013.01); *G06N 3/08* (2013.01); *G10L 25/51* (2013.01); *H04R 1/406* (2013.01); *H04R 2201/405* (2013.01); *H04R 2430/20* (2013.01)

(58) Field of Classification Search
CPC .. H04R 3/005; H04R 1/406; H04R 2201/405; H04R 2430/20; G06N 3/08; G10L 25/51
See application file for complete search history.

(56) References Cited

U.S. PATENT DOCUMENTS

| | | | |
|---|---|---|---|
| 6,707,910 B1 * | 3/2004 | Valve | G10L 25/78 342/423 |
| 8,527,276 B1 | 9/2013 | Senior et al. | |
| 8,676,728 B1 * | 3/2014 | Velusamy | H04R 1/406 706/12 |
| 9,177,550 B2 | 11/2015 | Yu et al. | |
| 9,432,768 B1 * | 8/2016 | O'Neill | H04R 3/005 |
| 2014/0142929 A1 | 5/2014 | Seide et al. | |
| 2015/0161522 A1 * | 6/2015 | Saon | G06N 3/08 706/12 |

FOREIGN PATENT DOCUMENTS

JP 2008085472 A * 4/2008

* cited by examiner

*Primary Examiner* — Brenda Bernardi
(74) *Attorney, Agent, or Firm* — Morris & Kamlay LLP

(57) ABSTRACT

A neural network is provided for recognition and enhancement of multi-channel sound signals received by multiple microphones, which need not be aligned in a linear array in a given environment. Directions and distances of sound sources may also be detected by the neural network without the need for a beamformer connected to the microphones. The neural network may be trained by knowledge gained from free-field array impulse responses obtained in an anechoic chamber, array impulse responses that model simulated environments of different reverberation times, and array impulse responses obtained in actual environments.

23 Claims, 7 Drawing Sheets

MULTI-MICROPHONE NEURAL NETWORK FOR SOUND RECOGNITION

BACKGROUND

Multi-microphone arrays have been used to enhance sound detection. Traditional schemes of multi-microphone sound detection include using a beamformer to combine sound signals received from multiple microphones to form an enhanced single-channel audio signal, which may be transmitted to a sound recognition system. The beamformer and the recognition system are typically designed independently of one another. As a consequence, enhancement of audio signals by the beamformer may not be optimal for the recognition system. Moreover, such beamformers typically require "tractable" array geometries such that the scattering and diffraction effects and beamformer response can be easily analyzed or optimized. However, such tractable array geometries may limit the number of design options for multi-microphone devices. For example, in conventional beamforming schemes which require tractable array geometries, the user may have a limited number of options in the physical placement of microphones in a given environment.

BRIEF SUMMARY

According to an embodiment of the disclosed subject matter, a method of training a neural network for multi-microphone sound recognition includes generating free-field array impulse responses over multiple directions based on sound events received by multiple microphones, generating a first set of array impulse responses that model simulated environments of different reverberation times, generating a second set of array impulse responses in one or more actual environments, and training the neural network for sound recognition based on one or more of the free-field array impulse responses, the first set of array impulse responses, and the second set of array impulse responses.

According to an embodiment of the disclosed subject matter, an apparatus for multi-microphone sound recognition includes a memory and a processor communicably coupled to the memory. In an embodiment, the processor is configured to execute instructions to generate free-field array impulse responses over multiple directions based on sound events received by multiple microphones, to generate a first set of array impulse responses that model simulated environments of different reverberation times, to generate a second set of array impulse responses in one or more actual environments, and to train a neural network for sound recognition based on one or more of the free-field array impulse responses, the first set of array impulse responses, and the second set of array impulse responses.

According to an embodiment of the disclosed subject matter, a sound system includes multiple microphones and a neural network having multiple layers. In an embodiment, one or more of the layers of the neural network is configured to be trained for sound recognition by generating free-field array impulse responses over multiple directions based on sound events received by the microphones, generating a first set of array impulse responses that model simulated environments of different reverberation times, generating a second set of array impulse responses in one or more actual environments, and applying one or more of the free-field array impulse responses, the first set of array impulse responses, and the second set of array impulse responses to train the neural network.

According to an embodiment of the disclosed subject matter, means for training a neural network for multi-microphone sound recognition are provided, which includes means for generating free-field array impulse responses over multiple directions based on sound events received by multiple microphones, generating a first set of array impulse responses that model simulated environments of different reverberation times, generating a second set of array impulse responses in one or more actual environments, and training the neural network for sound recognition based on one or more of the free-field array impulse responses, the first set of array impulse responses, and the second set of array impulse responses.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
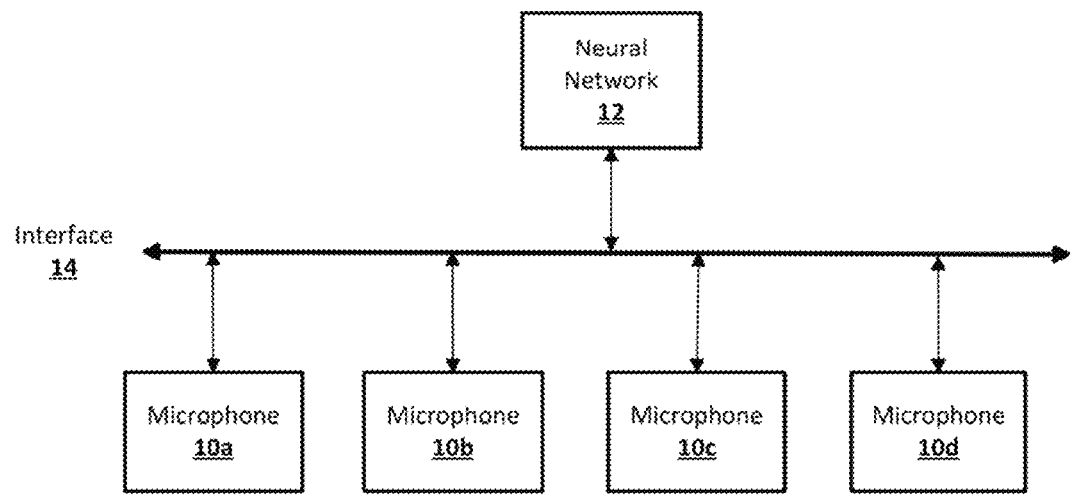
FIG. 1 shows a block diagram illustrating an example of a sound system which includes multiple microphones coupled to a neural network through an interface according to embodiments of the disclosed subject matter.

According to embodiments of this disclosure, methods and apparatus are provided for constructing neural networks, such as deep neural networks, that receive sound waveforms from arbitrary numbers of microphones arranged in arbitrary geometries. In the foregoing description, multiple microphones may be collectively referred to as an "array" of microphones, but the disclosed subject matter may not be limited to physical placements of microphones along a line or multiple lines. An "array" of microphones may include microphones placed in various physical locations in a given environment, for example, an indoor environment such as a smart-home environment, or in another type of environment.

In an embodiment, a neural network may be constructed to include lower layers having sufficient degrees of freedom to enhance or to suppress, spatially, spectrally, or temporally, multi-channel sound signals received from multiple microphones so as to improve recognition accuracy. In an embodiment, only the signals from prescribed look directions that are fixed beforehand are recognized and enhanced. In another embodiment, signal are recognized from look directions that can be specified in real time or near real time, such as, for example, a user-specified look direction, direction based on visual cues, or direction of the most dominant source. These recognized signals are then enhanced.

In an embodiment, signals from each channel of the microphone array may be transmitted directly to the neural network without a beamformer. As described in further detail below, high recognition accuracy may be achieved by joint optimization of enhancement and recognition parameters by the neural network. Moreover, by applying appropriate models and training methods, the neural network may capture complicated array shapes. Thus, the physical placement of multiple microphones need not be limited to certain geometries, thereby affording the user various options to place microphones at desired locations in a given environment.

In an embodiment, a neural network may be trained for sound recognition by a multi-microphone array by using a variety of array impulse responses generated in various actual and simulated environments. In an embodiment, free-field array impulse responses over multiple directions may be generated by measuring impulse responses of the multi-microphone array in free-field conditions, for example, in an anechoic chamber, based on sound events received by the multi-microphone array in the anechoic chamber. In an embodiment, free-field array impulse responses of a multi-microphone array over various directions may be generated by rotating the multi-microphone array in azimuth and/or elevation over various angles and taking measurements of impulse responses of the multi-microphone array. In addition to the free-field array impulse responses, a first set of array impulse responses that model simulated environments of different reverberation times may be generated. These simulated environments may be different from the free-field conditions of the anechoic chamber, and may be designed to simulate the actual environments in which the multi-microphone array are likely to be placed. Furthermore, a second set of array impulse responses may be measured in one or more actual environments. The free-field array impulse responses, the first set of array impulse responses that model simulated environments, and the second set of array impulse responses that are measured in actual environments, may be used as data sets for training the neural network for sound recognition. In some implementations, for example, training of the neural network may include applying positive training labels to sound events received from prescribed look directions, and negative training labels to sound events received from outside the prescribed look directions of the multi-microphone array.

FIG. 1 shows a block diagram illustrating an example of a sound system which includes multiple microphones 10a, 10b, 10c and 10d coupled to a neural network 12 through an interface 12. Although the microphones 10a, 10b, 10c and 10d may be collectively referred to as an "array" of microphones, they may but need not be physically placed in a linear array in a given environment.

Figure 2:
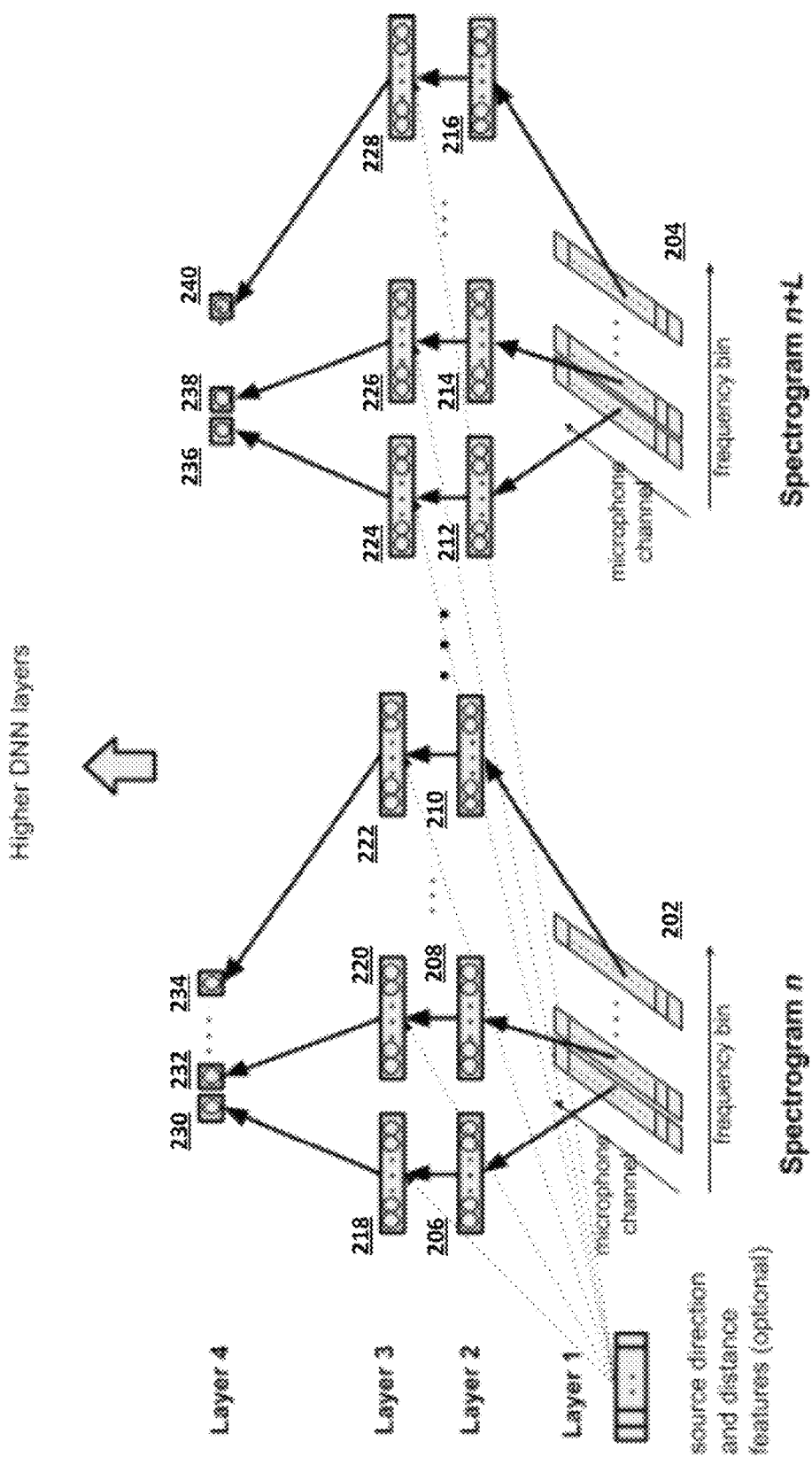
FIG. 2 shows a schematic diagram illustrating an example of a neural network having four neural network layers for processing sound events from multi-microphone inputs according to embodiments of the disclosed subject matter.

FIG. 2 shows a schematic diagram illustrating an example of a neural network having four neural network layers, namely, Layer 1, Layer 2, Layer 3, and Layer 4, for processing sound events from multi-microphone inputs. In FIG. 2, two spectrograms, namely, Spectrogram n and Spectrogram n+L, are illustrated. It is understood that over a given length of time, audio signals may be represented as multiple spectrograms. In an embodiment, a virtual beamformer may be modeled within the neural network even though a physical beamformer may not be connected to the microphones. Referring to FIG. 2, for Spectrogram n, the first layer, that is, Layer 1, includes microphone channels representing audio inputs from multiple microphones and frequency bins for each of the microphone channels, as illustrated in a two-dimensional coordinate 202. Likewise, for Spectrogram n+L, Layer 1 includes microphone channels representing audio inputs from multiple microphones and frequency bins for each of the microphone channels, as illustrated in a two-dimensional coordinate 204. Additional information on the sources of sound signals may be included in Layer 1. For example, the direction the distance of each source of sound signals with respect to a microphone array may be included in Layer 1.

In an embodiment, digitized samples of sound signals received from the microphones may be convolved with finite-duration impulse response (FIR) filters of prescribed lengths, and the outputs of the FIR filters are added together as follows:

$$y(n) = \Sigma_i h_i(n) * x_i(n) \quad (1)$$

where $x_i(n)$ and $h_i(n)$ are the ith channel microphone signal and the corresponding ith FIR filter, respectively. In the frequency domain, the convolution of the sound signal received from the ith channel microphone and the corresponding ith FIR filter may simply be replaced by a multiplication, that is:

$$Y(f) = \Sigma_i H_i(f) X_i(f) \quad (2)$$

Since the input features to a neural network are usually frequency-domain based representations of the signals, modeling the FIR filter within the neural network may be relatively straightforward in the frequency domain. Modeling the FIR filter response in the frequency domain may require that the parameters corresponding to the FIR filter be complex numbers, however. In an embodiment, additional non-linear post-processing, for example, by enhancing signals in one spectrum or suppressing signals in another spectrum, may be applied to the signals in the frequency domain.

In an embodiment, simulated or virtual implementation of a linear beamformer may be performed by convolving the microphone signals with corresponding FIR filters in the time domain, or equivalently, by multiplying frequency-domain representations of the microphone signals with corresponding FIR filter responses in the frequency domain. Referring to FIG. 2, the products of microphone signals and corresponding FIR filter responses in the frequency domain are represented as contents in the two-dimensional coordinates of microphone channel v. frequency bin in Layer 1 for each of the spectrograms.

In an embodiment, the second layer, that is, Layer 2 in FIG. 2, includes a plurality of nodes, such as sets of nodes 206, 208, ... 210 for Spectrogram n and sets of nodes 212, 214, ... 216 for Spectrogram n+L. In an embodiment, each node of Layer 2 may be interpreted as a virtual beamformer with a certain look direction. In another embodiment, each node of Layer 2 may be regarded as a modeled response of a virtual beamformer capable of forming combined beams in various look directions. The responses of virtual beamformers in various look directions may be modeled in various manners. For example, in one implementation, the modeled response of a virtual beamformer from multiple look directions may be produced by forming a linear combination of certain basis vectors, that is:

$$Y(f,\theta)=\alpha_1(\theta)\Sigma_i H_i^1(f)X_i(f)+ \ldots +\alpha_K(\theta)H_i^K(f)X_i(f) \quad (3)$$

Where $\theta$ is the angle corresponding to a particular look direction of the multi-microphone array, and $\alpha_i(\theta)$ is a scale factor for the ith basis vector at the angle $\theta$. Such a model can be adequately represented in one or more of the four layers of the neural network. For example, each node in Layer 2 of the neural network as shown in FIG. 2 may be interpreted as one of the basis functions in Equation (3), representing the modeled response of the virtual beamformer from one of a plurality of look directions (l=1, 2, ...). In an embodiment, by providing a large number of units per frequency bin in Layer 2, more degrees of freedom may be provided for modeling the virtual beamformer responses across different directions and distances.

In an embodiment, each node in the third layer, that is, Layer 3 as shown in FIG. 2, may be interpreted as the virtual beamformer response across various look directions. In FIG. 2, Layer 3 includes a plurality of nodes, such as sets of nodes 218, 220, ... 222 for Spectrogram n and sets of nodes 224, 226, ... 228 for Spectrogram n+L. In an embodiment, each node in Layer 3 may be regarded as a weighted interpolation of virtual beamformer responses across various look directions. Alternatively, each of node in Layer 3 may be regarded as a combination of the basis functions according to Equation (3) above. In an embodiment, with sufficient numbers of nodes or units in Layers 2 and 3, the neural network may be able to gain knowledge, that is, to be trained to model various phenomena of sounds, for example, non-linear relationships due to wave diffraction and scattering effects, or other effects that may be inherent to some microphone arrays in some environments. Referring to FIG. 2, the combined virtual beamformer responses across various directions generated in Layer 3 are transmitted to Layer 4, which includes a plurality of nodes 230, 232, ... 234 for Spectrogram n and a plurality of nodes 236, 238, ... 240 for Spectrogram n+L.

In an embodiment, in addition to the spectrogram features, the direction and distance features of the sound sources may also be provided to the neural network as optional inputs. Direction and distance features may be provided to one of the layers in the neural network, depending on the needs of a particular application. For example, instead of feeding the direction and distance features to Layer 1 as described above, these features may be provided to Layer 3 because the selection of desired virtual beamformer responses may occur in Layer 3 or above in the neural network. In another alternative, the direction and distance features may be provided to Layer 2, in which virtual beamformer responses are generated from certain look directions, before the virtual beamformer responses across various look directions are weighted, interpolated or combined.

In some applications, it may be desirable to capture the temporal relationships of sound signals in each frequency bin. In some applications, it may be desirable to combine surrounding temporal outputs of each frequency bin as a convolutional neural network. This combination may be regarded as having the effect of extending the filter length of the virtual beamformer.

Figure 3:
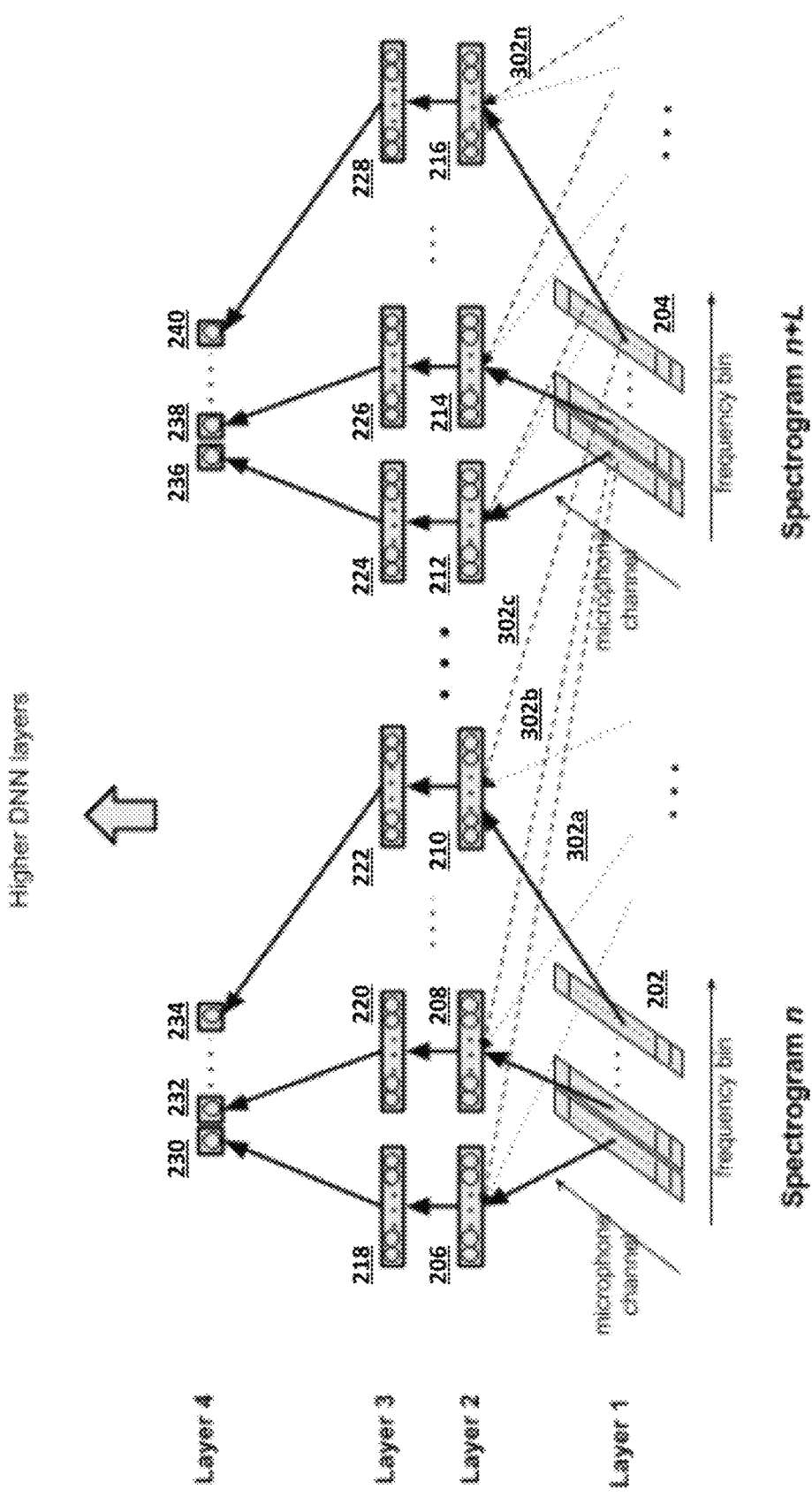
FIG. 3 shows a schematic diagram illustrating an example of combining surrounding temporal outputs of each frequency bin to capture temporal relationships in the neural network of FIG. 2 according to embodiments of the disclosed subject matter.

FIG. 3 shows a schematic diagram illustrating an example of combining surrounding temporal outputs of each frequency bin to capture temporal relationships in the neural network of FIG. 2. Referring to FIG. 3, the outputs from the surrounding past and future samples of a given frequency bin are combined from various microphone channels to form a convolutional neural network. In an embodiment, the temporal relationships between the frequency bins are captured by incorporating a convolutional network, from Layer 1 to Layer 2, as illustrated by dashed arrows 302a, 302b, 302c, ... 302n, for example, between different time instances of the frequency bins.

Unlike single-channel sound recognition, multi-channel sound recognition with multiple microphones requires phase information because spatial characteristics of the sound source are derived from the phases of sound signals received by those microphones. For frequency-domain based features, both the magnitude and phase information from each of the sound channels may be provided to the neural network. At least one layer of the neural network may be required to process complex numbers. In one example, the complex numbers may be processed in Layer 2 of the neural network. A complex number may be in the form of a real component and an imaginary component, or alternatively, in the form of a magnitude and a phase. In Layer 2 of the neural network, for example, each unit or node may receive complex inputs and produce a complex output. In this example, a neural unit with complex inputs and a complex output may be a relatively straightforward setup for Layer 2. In one example, the net result U within a complex unit is given by:

$$U=\Sigma_i W_i X_i + V \quad (4)$$

where $W_i$ is the complex-valued weight connecting complex-valued inputs, and V is the complex-valued threshold value. In order to obtain the complex-valued output signal, the net result U is converted into real and imaginary components, and these real and imaginary components are passed through an activation function $f_R(x)$ to obtain an output $f_{out}$ given by $$f_{out}=f_R(\Re(U))+if_R(\Im(U)) \quad (5)$$

where $$f_r(x) = \frac{1}{1+e^{-x}},$$

x∈R, for example. Various other complex-value computations may also be implemented within the scope of the disclosure.

In another embodiment, Layer 1 and Layer 2 of the neural network may involve complex computations whereas the upper layers, for example, Layer 3 and Layer 4, may involve computations of real numbers. For example, each unit or node in Layer 2 of the neural network may receive complex inputs and produce a real output. Various schemes may be implemented to generate a real output based on complex inputs. For example, one approach is to implement a complex-input-complex-output unit and to make the complex output real by simply taking the magnitude of the complex output:

$$f_{out} = |f_R(\Re(U)) + if_R(\Im(U))| \quad (6)$$

Alternatively, another approach is to apply the activation function on the absolute value of the complex sum, that is:

$$f_{out} = f_R(|U|) \quad (7)$$

In another alternative approach, each complex input feature is broken down into either the magnitude and phase components or the real and imaginary components. These components may be regarded as real input features. In other words, each complex number may be regarded as two separate real numbers representing the real and imaginary components of the complex number, or alternatively, two separate real numbers representing the magnitude and phase of the complex number.

Figure 4:
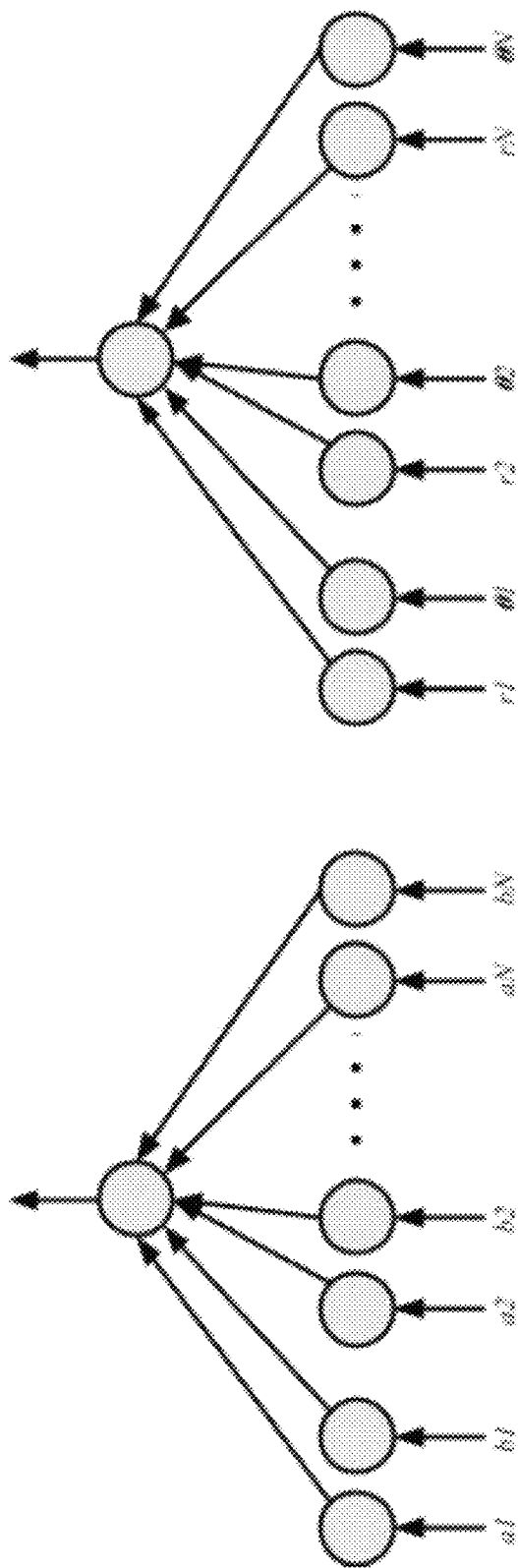
FIG. 4A shows a diagram of an example of neural units with real inputs which are the real and imaginary components of complex numbers according to embodiments of the disclosed subject matter.
FIG. 4B shows a diagram of an example of neural units with real inputs which are the magnitude and phase components of complex numbers according to embodiments of the disclosed subject matter.

FIG. 4A shows a diagram of an example of neural units with real inputs which are the real and imaginary components of complex numbers, whereas FIG. 4B shows a diagram of an example of neural units with real inputs which are the magnitude and phase components of complex numbers. In FIG. 4A, the coefficients a1, a2, ... aN are the real components of complex numbers, while the coefficients b1, b2, ... bN are the imaginary components of complex numbers. In FIG. 4B, the numbers r1, r2, ... rN are the magnitudes of complex numbers, while the angles θ1, θ2, ... θN are the phases of complex numbers.

In various embodiments, the neural network may be trained to recognize and to enhance sounds detected by multiple microphones in a given environment. In an embodiment, the neural network may be trained to enhance and recognize a sound event only if the source of the sound event comes from prescribed look directions as sensed by the microphones. In another embodiment, the neural network may be trained to take the look direction of a sound source as part of the input features if sound recognition is not limited to certain prescribed look directions. In a further embodiment, the neural network also may be trained to take distances between the microphones and the sound source as part of the input features. Other parameters related to sound sources may also be taken as input features to the neural network within the scope of the disclosure.

In an embodiment, positive training labels are applied to input sound signals corresponding to sound events or speech units from a prescribed look direction or multiple prescribed look directions. In an embodiment, if the sound events come from outside the prescribed look directions, then negative training labels are applied to input sound signals corresponding to those sound events.

In an embodiment in which the direction or distance of a sound source is part of the input features to the neural network, positive training labels may be applied to sound signals from various sound sources from various directions. If an array of multiple microphones are provided to receive sounds from all directions in a given environment, positive training can be applied to sounds coming from any direction. In this embodiment, the neural network can be trained to focus and to recognize sounds events from any direction. In a further embodiment, the neural network may also be configured to predict the distance and the direction of the source of sound events received by the array of microphones.

In an embodiment, training the neural network to recognize and to enhance detected sounds in a given environment involves generation of sufficient training data to allow the neural network to gain sufficient knowledge of the environment as well as the characteristics of the array of microphones. In an embodiment, the process of generating sufficient training data for the neural network includes using an anechoic chamber, that is, an enclosed environment with walls that ideally absorb all sounds, to generate free-field array impulse responses from various direction and distances, for example. Within the anechoic chamber, the microphones are positioned in the same manner as they would be positioned in a real environment.

In an embodiment, the free-field array impulse responses obtained in the anechoic chamber may be used to generate a first set of array impulse responses that model simulated rooms or environments of different reverberation times, for example, by varying the size of the simulated room or environment, or by varying the reflectivity coefficients of the boundaries of the simulated room or environment, such as walls, floor, ceiling, doors or windows. In an embodiment, the first set of array impulse responses may also model the microphones placed at various locations within the room or the environment, taking into account gain and phase variations between different microphones. In other words, the free-field array impulse responses may be incorporated in a room impulse response simulator to "auralize" multi-channel sound signals with respect to a given array of microphones for different types of rooms.

In an embodiment, a second set of array impulse responses may be obtained in actual environments, such as actual rooms in typical homes. In an embodiment, various types of array impulse responses, including the free-field array impulse responses obtained in the anechoic chamber, the first set of array impulse responses that model simulated environments of different reverberation times, and the second set of array impulse responses obtained in actual environments, may be used to generate training data to train the neural network for multi-microphone sound recognition.

In some implementations, an advantage of generating impulse responses in an anechoic chamber is that, for a fixed distance, the array of microphones only need be rotated about a given point to generate the free-field array impulse responses from various directions. Further measurements of free-field array impulse responses can also be obtained by rotating the microphone array about different centers of rotation within the anechoic chamber. Thus, free-field array impulse responses across a dense grid of distance and directions may be generated in a relatively fast and efficient manner. These free-field array impulse responses can then be used by a room impulse response simulator to model impulse responses of rooms with various reverberation times.

Figure 5:
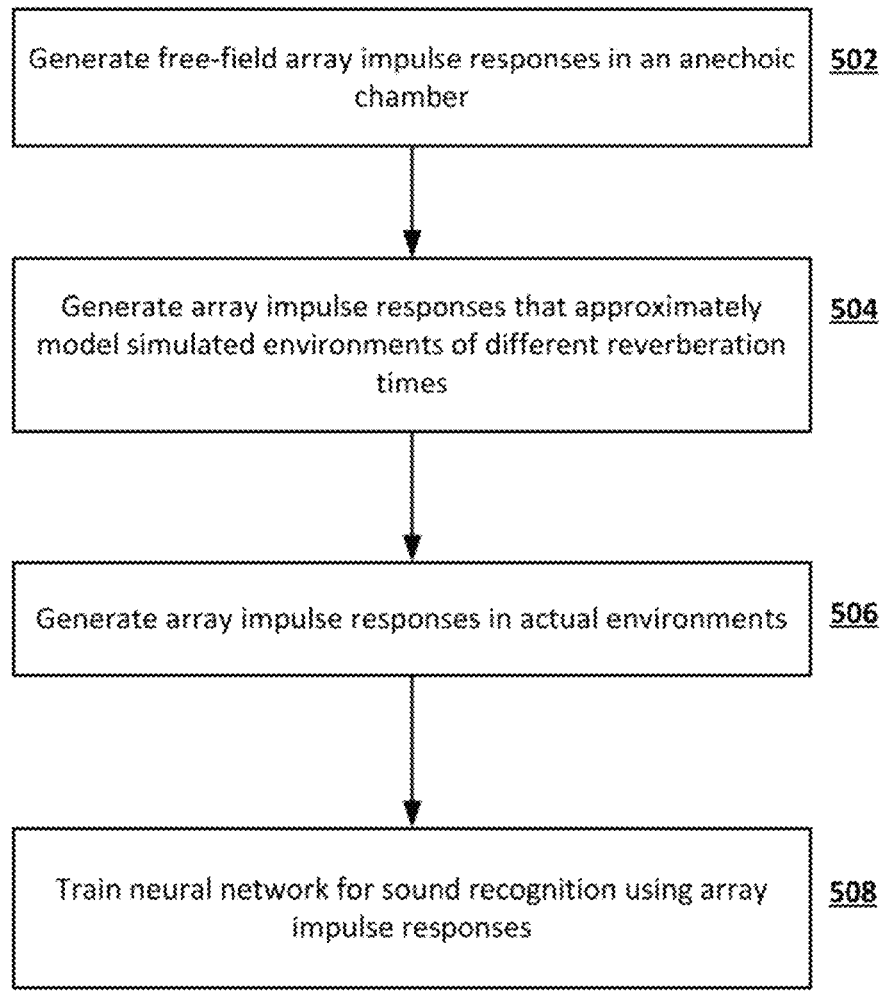
FIG. 5 shows a flowchart illustrating an example of a process for training neural networks using impulse responses obtained from an array of microphones according to embodiments of the disclosed subject matter.

FIG. 5 shows a flowchart illustrating an example of a process for training neural networks using impulse responses obtained from an array of microphones. In FIG. 5, free-field array impulse responses to represent impulse responses of the multi-microphone array in free-field conditions may be generated in an ideal or near-ideal environment, for example, an anechoic chamber in block 502. The free-field array impulse responses are used to generate a first set of array impulse responses that model simulated environments, such as simulated rooms, of different reverberation times, in block 504. A second set of array impulse responses are generated in actual environments, such as actual rooms, in block 506. The neural network may be trained for sound recognition in block 508, by using one or more of the free-field array impulse responses obtained in the anechoic chamber, the first set of array impulse responses that model simulated environments, and the second set of array impulse responses obtained in actual environments.

Figure 6:
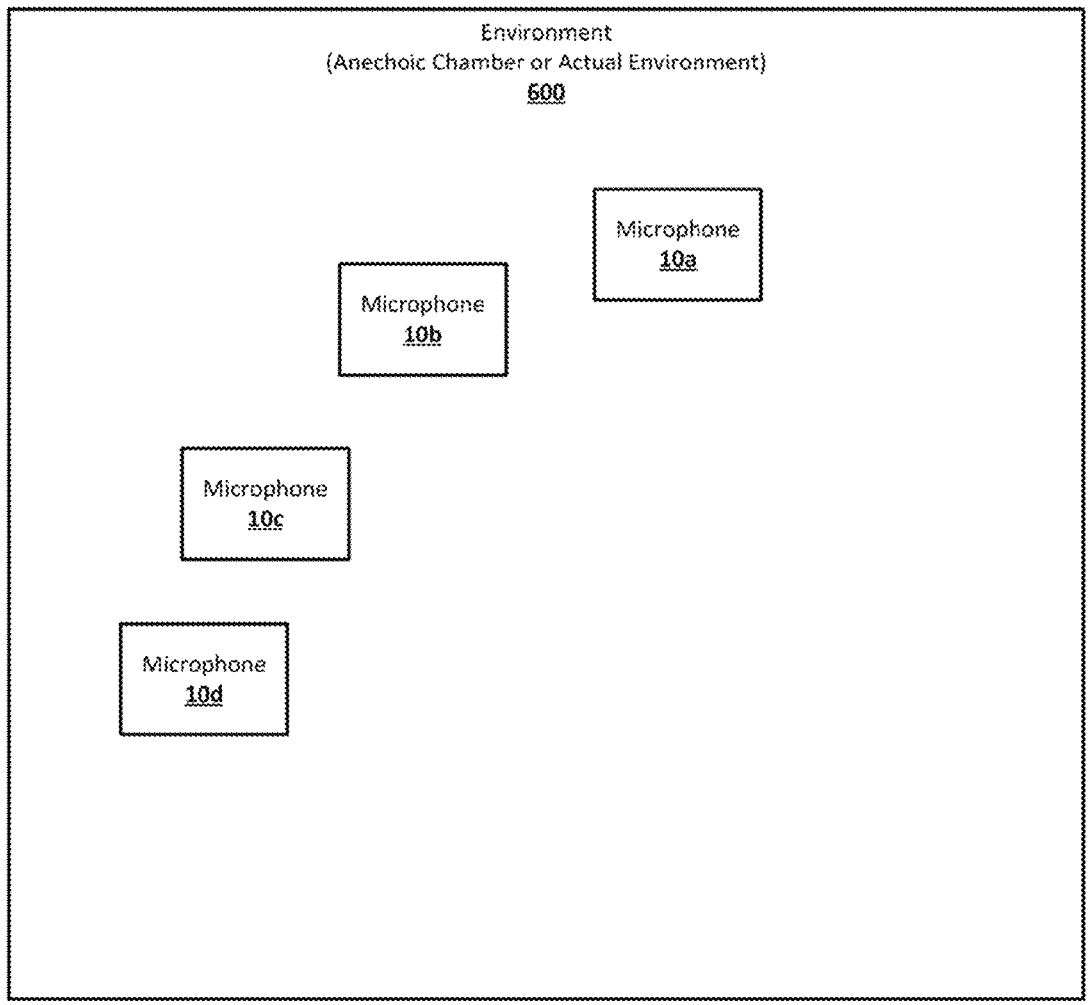
FIG. 6 shows an example of an array of microphones positioned in an environment, which may be an anechoic chamber or an actual environment, for training a neural network for multi-microphone sound recognition according to embodiments of the disclosed subject matter.

FIG. 6 shows an example of an array of microphones 10a, 10b, 10c and 10d positioned in an environment 600, which may be an anechoic chamber or an actual environment, for training a neural network for multi-microphone sound recognition. As illustrated in FIG. 6, the microphones 10a, 10b, 10c and 10d may but need not be physically positioned along a line. As described above, the "array" of microphones need not be a physically linear array. The environment 600 in which the microphones 10a, 10b, 10c and 10d are placed may be an anechoic chamber for obtaining free-field array impulse responses as described above with reference to block 502 in FIG. 5, or an actual environment, such as a room, for obtaining the second set of array impulse responses as described above with reference to block 506 in FIG. 5. After the neural network is appropriately trained, it may perform various functions associated with sound recognition, including, for example, categorizing an unknown audio clip or segment of a sound event, such as classical music, jazz, country, rock-and-roll, heavy metal, etc., or human speech, baby cry, pet noise, siren, etc., or estimating the location of the source of the sound event, or various other functions.

Figure 7:
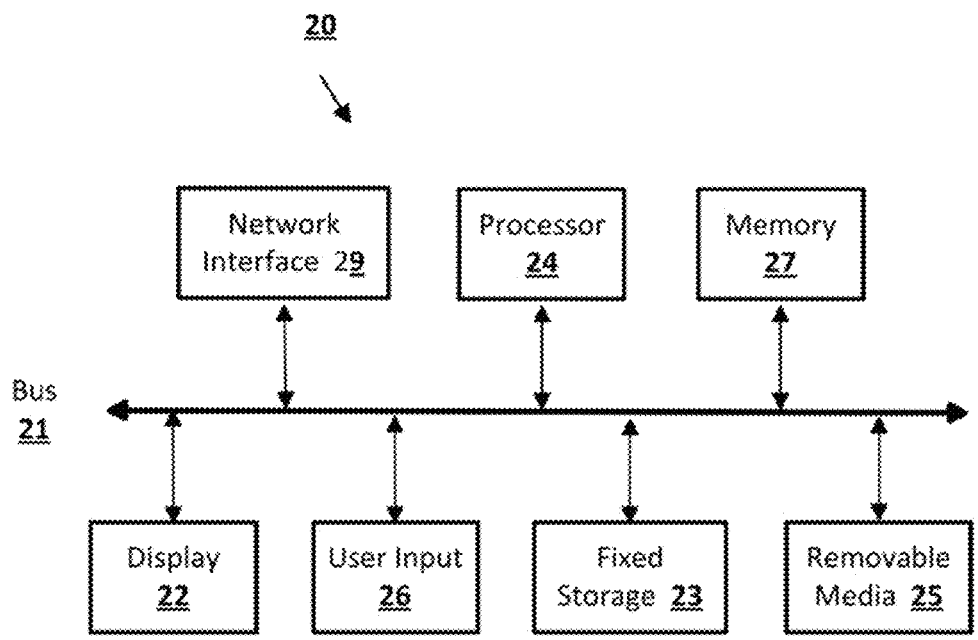
FIG. 7 shows an example of a computing device according to embodiments of the disclosed subject matter.

Embodiments of the presently disclosed subject matter may be implemented in and used with a variety of component and network architectures. For example, the neural network 12 as shown in FIG. 1 may include one or more computing devices for implementing embodiments of the subject matter described above. FIG. 7 shows an example of a computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computer such as that shown in FIG. 7 readily known in the art and is not discussed in detail in this application. Code to implement the present disclosure can be stored in computer-readable storage media such as one or more of the memory 27, fixed storage 23, removable media 25, or on a remote storage location.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor or an Application Specific Integrated Circuit (ASIC) that embodies all or part of the techniques according to embodiments of the disclosed subject matter in hardware or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

In some embodiments, the microphones 10a, 10b, 10c and 10d as shown in FIG. 1 may be implemented as part of a network of sensors. These sensors may include microphones for sound detection, for example, and may also include other types of sensors. In general, a "sensor" may refer to any device that can obtain information about its environment.

Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, or other sensors. Such a housing also may be referred to as a sensor or a sensor device. For clarity, sensors are described with respect to the particular functions they perform or the particular physical hardware used, when such specification is necessary for understanding of the embodiments disclosed herein.

Figure 8:
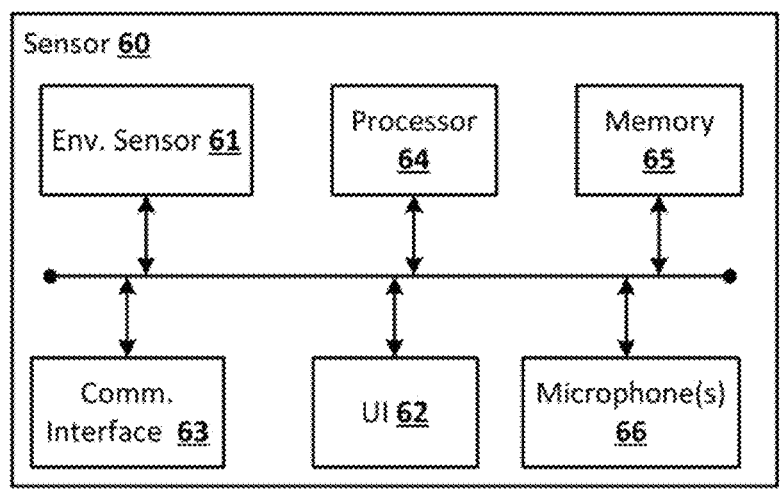
FIG. 8 shows an example of a sensor according to embodiments of the disclosed subject matter.

A sensor may include hardware in addition to the specific physical sensor that obtains information about the environment. FIG. 8 shows an example of a sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. Furthermore, the sensor 60 may include one or more microphones 66 to detect sounds in the environment. One or more components may be implemented in a single physical arrangement, such as where multiple components are implemented on a single integrated circuit. Sensors as disclosed herein may include other components, or may not include all of the illustrative components shown.

Sensors as disclosed herein may operate within a communication network, such as a conventional wireless network, or a sensor-specific network through which sensors may communicate with one another or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Moreover, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment, in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services or communication protocols.

A smart-home environment may include communication with devices outside of the smart-home environment but within a proximate geographical range of the home. For example, the smart-home environment may communicate information through the communication network or directly to a central server or cloud-computing system regarding detected movement or presence of people, animals, and any other objects and receives back commands for controlling the lighting accordingly.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
generating a plurality of free-field array impulse responses representing impulse responses of a plurality of microphones in free-field conditions over a plurality of directions based on sound events received by the microphones;
generating a first plurality of array impulse responses that model a plurality of simulated environments of different reverberation times, wherein the simulated environments differ from the free-field conditions in which the free-field array impulse responses are generated;
generating a second plurality of array impulse responses in one or more actual environments, wherein the one or more actual environments differ from the free-field conditions in which the free-field array impulse responses are generated; and
training a neural network for sound recognition based on one or more of the free-field array impulse responses, the first plurality of array impulse responses, and the second plurality of array impulse responses, wherein training the neural network for sound recognition includes:
applying positive training labels to input sound signals corresponding to sound events from one or more prescribed directions; and
applying negative training labels are applied to input sound signals corresponding to sound events from directions other than the one or more prescribed directions.

2. The method of claim 1, wherein generating the free-field array impulse responses comprises generating the free-field array impulse responses in an anechoic chamber.

3. The method of claim 2, wherein generating the free-field array impulse responses further comprises rotating the microphones about a center of rotation to position the microphones to receive the sound events over the plurality of directions.

4. The method of claim 3, wherein generating the free-field array impulse responses further comprises generating the free-field array impulse responses over a plurality of distances.

5. The method of claim 1, wherein generating the first plurality of array impulse responses that model the simulated environments comprises generating the first plurality of array impulse responses by varying sizes of the simulated environments.

6. The method of claim 1, wherein generating the first plurality of array impulse responses that model the simulated environments comprises generating the first plurality of array impulse responses by varying one or more reflectivity coefficients of one or more boundaries of the simulated environments.

7. The method of claim 1, wherein generating the first plurality of array impulse responses that model the simulated environments comprises generating the first plurality of array impulse responses by modeling gain and phase variations of the microphones.

8. The method of claim 1, further comprising incorporating the free-field array impulse responses into the first plurality of array impulse responses that model the simulated environments of different reverberation times.

9. The method of claim 1, wherein microphones are not aligned in a linear array.

10. The method of claim 1, further comprising training the neural network for detecting directions of sound events without a beamformer connected to the microphones.

11. The method of claim 1, further comprising recognizing a sound event based on the training of the neural network, wherein recognizing the sound event comprises:
categorizing one or more segments of the sound event as one or more types of sound; or
estimating a location of a source of the sound event.

12. An apparatus comprising:
a memory; and
a processor communicably coupled to the memory, the processor configured to execute instructions to:
generate a plurality of free-field array impulse responses representing impulse responses of a plurality of microphones in free-field conditions over a plurality of directions based on sound events received by the microphones;
generate a first plurality of array impulse responses that model a plurality of simulated environments of different reverberation times, wherein the simulated environments differ from the free-field conditions in which the free-field array impulse responses are generated;
generate a second plurality of array impulse responses in one or more actual environments, wherein the one or more actual environments differ from the free-field conditions in which the free-field array impulse responses are generated; and
train a neural network for sound recognition based on one or more of the free-field array impulse responses, the first plurality of array impulse responses, and the second plurality of array impulse responses, wherein the instructions to train the neural network for sound recognition include instructions to:
apply positive training labels to input sound signals corresponding to sound events from one or more prescribed directions; and
apply negative training labels are applied to input sound signals corresponding to sound events from directions other than the one or more prescribed directions.

13. The apparatus of claim 12, wherein the instructions to generate the free-field array impulse responses comprises instructions to generate the free-field array impulse responses in an anechoic chamber.

14. The apparatus of claim 13, wherein the instructions to generate the free-field array impulse responses further comprises instructions to rotate the microphones about a center of rotation to position the microphones to receive the sound events over the plurality of directions.

15. The apparatus of claim 12, wherein the instructions to generate the first plurality of array impulse responses that model the simulated environments comprises instructions to generate the first plurality of array impulse responses by varying one or more reflectivity coefficients of one or more boundaries of the simulated environments.

16. The apparatus of claim 12, wherein the instructions to generate the first plurality of array impulse responses that model the simulated environments comprises instructions to generate the first plurality of array impulse responses by modeling gain and phase variations of the microphones.

17. The apparatus of claim 12, wherein the processor is further configured to execute instructions to recognize a sound event, comprising instructions to:
  categorize one or more segments of the sound event as one or more types of sound; or
  estimate a location of a source of the sound event.

18. A sound system comprising:
  a plurality of microphones; and
  a neural network comprising a plurality of layers, wherein one or more of the layers of the neural network is configured to be trained for sound recognition by:
    generating a plurality of free-field array impulse responses representing impulse responses of a plurality of microphones in free-field conditions over a plurality of directions based on sound events received by the microphones;
    generating a first plurality of array impulse responses that model a plurality of simulated environments of different reverberation times, wherein the simulated environments differ from the free-field conditions in which the free-field array impulse responses are generated;
    generating a second plurality of array impulse responses in one or more actual environments, wherein the one or more actual environments differ from the free-field conditions in which the free-field array impulse responses are generated; and
    training a neural network for sound recognition based on one or more of the free-field array impulse responses, the first plurality of array impulse responses, and the second plurality of array impulse responses, wherein training the neural network for sound recognition includes:
      applying positive training labels to input sound signals corresponding to sound events from one or more prescribed directions; and
      applying negative training labels are applied to input sound signals corresponding to sound events from directions other than the one or more prescribed directions.

19. The sound system of claim 18, wherein the free-field array impulse responses are generated in an anechoic chamber.

20. The sound system of claim 18, wherein the free-field array impulse responses are generated over the plurality of directions by rotating the microphones about a center of rotation.

21. The sound system of claim 18, wherein the first plurality of array impulse responses that model the simulated environments are generated by varying reflectivity coefficients of one or more boundaries of the simulated environments.

22. The sound system of claim 18, wherein the first plurality of array impulse responses that model the simulated environments are generated by modeling gain and phase variations of the microphones.

23. The sound system of claim 18, wherein the neural network is further configured to recognize a sound event by:
  categorizing one or more segments of the sound event as one or more types of sound; or
  estimating a location of a source of the sound event.

* * * * *